United States Patent [19]
Fitzgerald et al.

[11] Patent Number: 5,883,926
[45] Date of Patent: Mar. 16, 1999

[54] METHOD AND APPARATUS FOR COMMUNICATING DATA AND CLOCK SIGNALS

[75] Inventors: John J. Fitzgerald, Leominster; Carl G. Hayssen, Andover, both of Mass.

[73] Assignee: UB Networks, Inc., Santa Clara, Calif.

[21] Appl. No.: 627,785

[22] Filed: Mar. 28, 1996

[51] Int. Cl.$^6$ .................................................. H04B 3/00
[52] U.S. Cl. ................................ 375/257; 395/259
[58] Field of Search ............................ 375/259, 257, 375/258, 361, 359; 370/284; 326/86; 327/108

[56] References Cited

U.S. PATENT DOCUMENTS

| | | | |
|---|---|---|---|
| 5,235,617 | 8/1993 | Mallard, Jr. | 375/258 |
| 5,287,386 | 2/1994 | Wade et al. | 375/257 |
| 5,504,782 | 4/1996 | Campbell, Jr. | 375/259 |
| 5,666,354 | 9/1997 | Cecchi et al. | 375/259 |

*Primary Examiner*—Chi H. Pham
*Assistant Examiner*—Bryan Webster
*Attorney, Agent, or Firm*—Townsend and Townsend and Crew

[57] ABSTRACT

A communication system communicates a high-speed clock or other balanced signal on the backs of two data signals by differentially modulating the data signals with the clock signal and communicating the two data signals in differential common mode form. The clock signal is extracted from the data signals at the receiving end of the system by applying the data signals to differential line receivers.

21 Claims, 2 Drawing Sheets

METHOD AND APPARATUS FOR COMMUNICATING DATA AND CLOCK SIGNALS

BACKGROUND OF THE INVENTION

The present invention relates generally to data communication, and specifically to a method, and apparatus implementing that method, for high-speed, synchronous transmission of data.

In data communications topologies, for example those used for local area networks, data is often communicated by a transmission medium comprising some form of physical signal path such as electrical wires, printed circuit paths and the like. Often, for high-speed, synchronous data transmissions and higher throughput, data bits are transmitted in parallel together with a clock signal. A drawback to this form of data transmission is that there always seems to be a need for one more data bit path when one does not exist. Thus, when there are less paths than data bit signals (i.e., a parallel grouping of data bits), resort must be made to a parallel/serial scheme of data transmission. For example, suppose data is desired to be synchronously communicated from a source to a destination in eight bit quantities, accompanied by a clock signal, but there are only eight signal paths available. One solution is to transmit, for each eight bit quantity, two groups of bits. But this degrades performance by approximately one-half.

Another solution is to design the system to use an encoding scheme whereby at least one data bit is encoded (such as Manchester encoding) to include the clock signal that is extracted at the destination. However, this requires that the underlying design incorporate this solution by including the necessary encoding circuitry. Another solution must be found if an existing design, such as off-the-shelf elements, is to be used.

SUMMARY OF THE INVENTION

The present invention provides a simple technique for combining a clock signal with N data signals so that synchronous transmission of the data is accomplished using only N circuit paths.

In an embodiment of the invention, a number of data bits are synchronously communicated with an associated clock from a source to a destination. To enhance noise rejection, each data bit is transmitted in differential mode, using a communication path pair driven by a differential line driver at the source, and received at the destination by a differential line receiver. Inserted in the wiring pairs of two data bits are the secondary windings of a transformer. The primary winding of the transformer is driven by a differential line driver that receives a balanced clock signal. At the destination end of the communication paths for the two data bits are two more transformers. The primary windings of the two transformers are included in the communication paths of, and therefore driven by, the two data bits. The secondary windings of the two transformers form an input circuit to a differential line receiver.

In operation, a high-speed clock signal is preferably used. The clock signal is differentially modulated by the transformer onto the signals of the two data bits at the source end of the communication paths. The two data signals are communicated to the two transformers at the destination end of the communication paths where the clock signal is differentially extracted from the data bit signals. In this manner, three information signals—two data signals and a clock signal—are synchronously transmitted on only two differential communication paths.

The teachings of the present invention can be extended to communicate any N bits of differential data on 2N/3 pairs of signal paths in differential form by encoding one of each three data bits into a balanced signal that can be differentially modulated onto two other of the data bits in the manner described above.

There are a number of advantages achieved by the present invention. First is the capability of synchronous communication of a clock signal or other balanced signal using the communication paths of other signals, i.e., data signals. This allows the use of the existing apparatus having only N communication paths to communicate N+1 signals.

Another advantage of the present invention is that its use does not involve, and does not require, any redesign of the circuitry producing the data/clock signals or the circuitry at the receiving end.

These and other features and advantages of the present invention will become apparent to those with ordinary skill in this art upon a reading of the following detailed description of the invention, which should be taken in conjunction with the accompanying drawings.

DETAILED DESCRIPTION OF THE INVENTION

Figure 1:
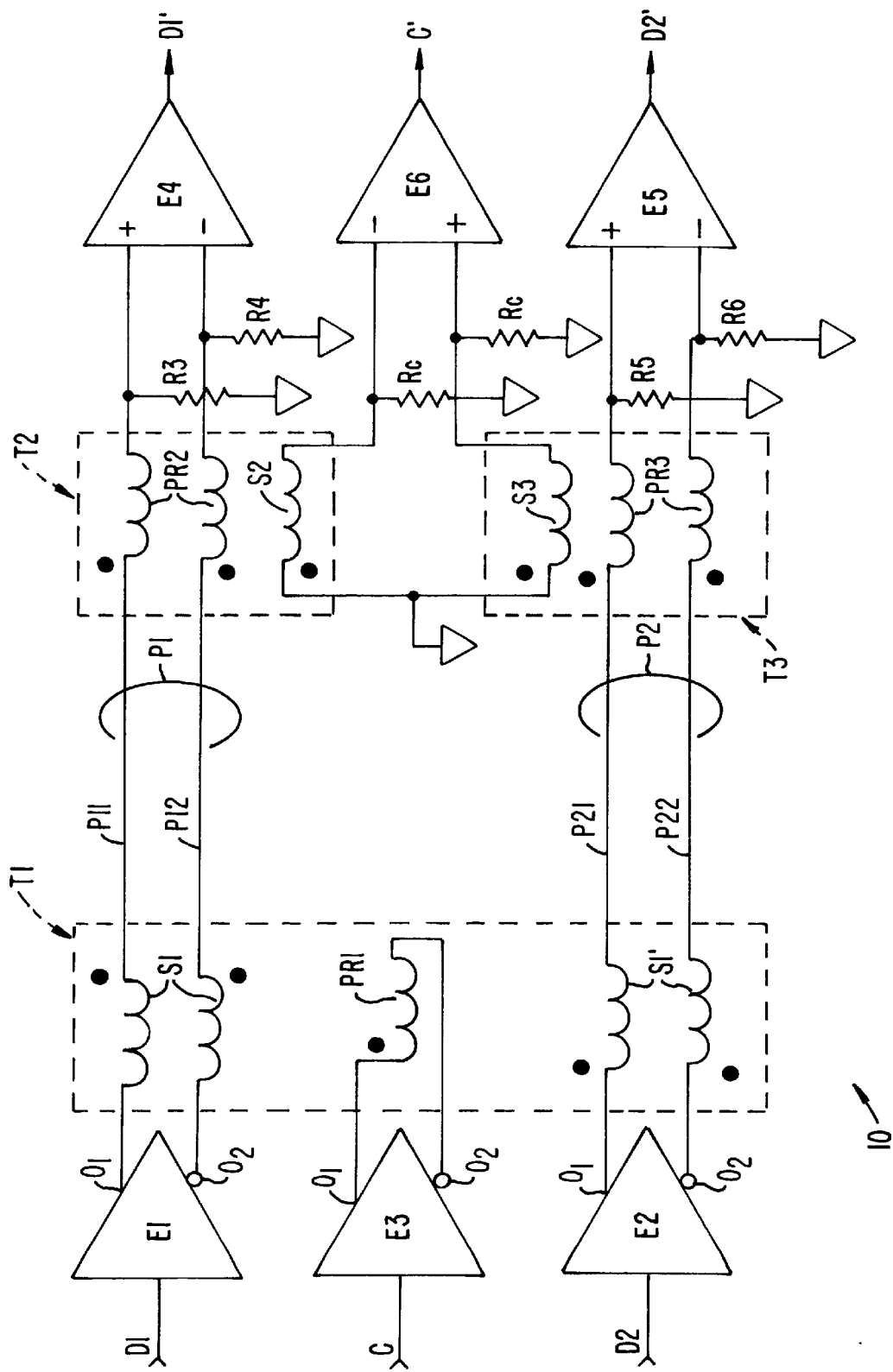
FIG. 1 is a schematic diagram that illustrates the present invention to communicate a clock signal impressed upon two data signals.

Turning now to the figures, and for the moment FIG. 1, there is illustrated a communication system structured accordingly to the present invention to synchronously communicate two data signals and an accompanying clock signal over two communication paths. As FIG. 1 shows, the two data signals, D1, D2 are respectively applied to the inputs of differential line drive circuits E1, E2. Each of the differential line driver circuits, E1, E2 has complementary outputs $O_1$, $O_2$ for differentially driving communication path pairs P1 and P2. The communication path pairs could be twisted pair wiring, or printed circuit paths formed on a backplane of a digital system (not shown). A clock signal (C) is also applied to a differential line driver E3, having complementary outputs $O_1$, $O_2$.

Inserted in each leg P11, P12, P21, P22 of the communication paths P1, P2 are the secondary windings S1, S1' of a transformer T1. The primary winding, PR1, is coupled to the complementary outputs $O_1$, $O_2$ of the differential line drive E3 to be differentially driven. The primary and secondary windings PR1, S1, S1' are designed so the secondary windings of one pair (e.g., P1) will be impressed with a positive version of the signal applied to the primary winding PR1, i.e., the clock signal, while the secondary in the other pair (P2) produces the complement thereof: the negative version of the clock signal.

The receiving ends of the communication paths P1, P2 are applied to the differential inputs of line receivers E4 and E5 through primary windings PR2, PR3 of transformers T2, T3, respectively. The secondary windings S2, S3 of the transformers T2, T3 are coupled to the differential inputs of a line receiver E6. Each leg p11, p12 and p21, p22 of the communication paths P1 and P2 is terminated with a resistance R3, R4, R5, and R6, respectively. Resistors pairs R3, R4 and R5, R6 are selected to match the differential line termination for communication paths P1 and P2, and are equal to one another. Further, the termination impedance of the paths P1, P2 are preferably equal to one another.

The communication system of FIG. 1 operates as follows. The data signals D1, D2 and clock C are respectively applied to the differential line drivers E1, E2, E3. The line drivers E1, E2, in turn operate to differentially drive the communication paths P1, P2. The differential outputs $O_1$, $O_2$ of the line driver E3 drive the opposite ends of the primary winding PR of the transformer T1 to impress across the mutually coupled secondary windings S1, S1' the output of line driver E3 as a function of the primary to secondary turns ratio. As indicated in FIG. 1, there is a polarity inversion between the secondary windings S1, S1' so that the clock signal impressed on the secondary windings S1 (and across the two lines forming the communication path P1) is opposite that impressed across the secondary windings S1' and lines forming communication path P2. The output of the line driver E3 is, therefore, differentially modulated across the two communication paths P1, P2.

Thus, each communication path P1, P2 will carry a common mode amplitude representation of the clock signal C, communicated with the two data signals to the receiving end of the communication paths P1, P2. The two data signals, modulated by the clock signal is received by the line receivers E4, E5—serially through the primary winding pairs PR2, PR2' of the transformers T2 and T3. The transformers T2, T3 operate to demodulate the clock signal from the data signals at the secondary windings S2, S3. The differential data signals are extracted from each communication path P1, and P2 by the differential line receivers E4 and E5 which cancels out the common mode clock signal impressed thereon. The data signals are removed from the reconstruction of the clock signal by the primary windings PR2 and PR3. Since the data signal in each winding of the pair that make up the primary PR2 (or PR3) is substantially equal in magnitude but opposite in phase, they will cancel each other. Thus, only the clock signal will be coupled from each primary winding PR2, PR3 to the corresponding secondary windings S2, S3. The outputs of the line receivers E4, E5, and E6 provide the two data signals and the clock signal, respectively.

The differential line drivers E1 and E2 both have a common mode source impedance. Accordingly, the resultant output voltage V11 measured at the signal line p11 (assuming the line is common mode terminated) of the communication path P1 is:

$$V11 = E1(\text{out}) + N^*E3(\text{out}) \quad \text{Eq. 1}$$

where E1(out) is the positive output of the differential line driver E1. Similarly, the output voltage V12 on the p1' signal line is:

$$V12 = -E1(\text{out}) + N^*E3(\text{out}) \quad \text{Eq. 2}$$

The voltages V21 and V22 on the signal lines p2, p2' forming the communication path P2 are:

$$V21 = E2(\text{out}) + N^*E3(\text{out}), \quad \text{Eq. 3}$$

and $$V22 = -E2(\text{out}) + N^*E3 \text{ (out)}. \quad \text{Eq. 4}$$

It will be noted by those skilled in this art that E1(out) and −E1(out) are the respective loaded positive and negative polarity portions of the differential output of driver E1.

E3(out) is the loaded differential output of the differential line driver E3, and N is the secondary to primary turns ratio of the transformer T1. Since the primary windings PR2 are series connected with the communication lines p1 and p1' and the termination resistors R3 and R4 to ground potential, the signal developed across the primary windings PR1 is a function of the turns ratio, N, and the common mode source and termination impedances. Since the output voltage of the transformer T2, V2, across the secondary winding S2 is due to the common mode signal on lines p1, p1', this output voltage is:

$$V2 = (N^*E3(\text{out})^*2^*Re/M)/(Rsg+R3+Re^*2/M^2) + (Vemn^*2Re/M)/(Rsg+R3+Re^*2/M^2+2^*Rd^*N^2) \quad \text{Eq. 5}$$

Where,

Rsg is the common mode source impedance of the output $O_1$ or $O_2$ of the differential line driver E1;

R3 and R4 are selected to match the differential line termination of p11, p12.

M is the secondary to primary turns ratio of the transformer T2;

Rd is the differential impedance seen at the primary windings of the transformer T1, and is approximately equal to the differential source impedance of line driver E3;

Vemn is the common mode noise voltage seen by both communication paths P1, P2 due to external noise; and Re is the load resistance across the primary winding PR2 of transformer T2, selected for required common mode termination.

In similar fashion, the signal developed across the secondary winding S3 of the transformer T3 is found to be:

$$V3 = (N^*E3(\text{out})^*2^*Re/M)/(Rsg+R3+Re^*2/M^2) - (Vemn^*2^*Re/M)(Rsg+R3+Re^*2/M^2+2^*Rd^*N^2). \quad \text{Eq. 6}$$

R3, R4, R5, and R6 are selected as described above to be equal to each other. Summing the two outputs (Eqs. 5 and 6) of the secondary windings produces the input voltage V6(in) to the line receiver E6:

$$V6(\text{in}) = 2^*(N^*E3(\text{out})^*2^*Re/M)/(Rsg+R3+Re^*2/M^2)$$

The voltages developed across the resistors R3 and R4 are:

$$V(R3) = E1(\text{out}) + (N^*E3(\text{out})^*R3)/(Rsg+R3+Re^*2/M^2),$$

and $$V(R4) = -E1(\text{out}) + (N^*E3(\text{out})^*R4)/(Rsg+R4+Re^*2/M^2).$$

The inputs to the line receiver E4 is the differential sum of the voltages developed across the resistors R3 and R4 or, $$V4(\text{in}) = V(R3) - V(R4) = E1(\text{out}) - (-E1(\text{out})) = 2E1(\text{out}).$$

But since E1(out) is the loaded positive (or negative) portion of the differential output of driver E1, 2E1(out) is the data bit signal D1. The common mode noise voltage Vemn is ignored since it will be differentially summed to zero at the input of the line receiver E4. Thus, the differential signal received at the input of the line receiver E4 is the original data signal produced by the differential; line driver E1. A similar analysis can be made for the input to line receiver E5.

Representative values of the components of the system of FIG. 1 depend upon the implementation of the communication paths and the transmission speed. For example, with a transmission speed something on the order of 350 megabits, and using printed circuit transmission paths having 50 ohm impedance, the primary winding of the transformer T1 is approximately 4 microhenrys, and the four secondary windings are each 1 microhenry. Each of the two primary windings of transformers T2 and T3 have a value of 1 microhenry, and the two secondaries are each 16 microhenrys. With these values, the invention allows for a transmitted clock rate in the range of 10 MHz to 50 MHz. Other clock rates may be used, but the transformer values will need to be changed to efficiently accommodate such other clock rates.

Further, it should be evident to those skilled in this art that for efficient signal coupling, a main design requirement for the transformers is that they be constructed to maintain sharp data and edge clock rates. For example, for clock frequencies in the range stated above (10–50 Mhz), the data and clock edge rates should be in the sub-nanosecond range for efficient operation.

The clock signal used is a balanced signal having a duty cycle Preferably in the range of 45%–55%. Although the invention thus far described is used to communicate a clock signal on the backs of two data signals, a balanced signal may be used. Thus, referring to FIG. 2, there is illustrated a communication system designated with the reference numeral 20 structured according to the teachings of the present invention to communicate 15 data signals on 10 sets of common mode line pairs.

Figure 2:
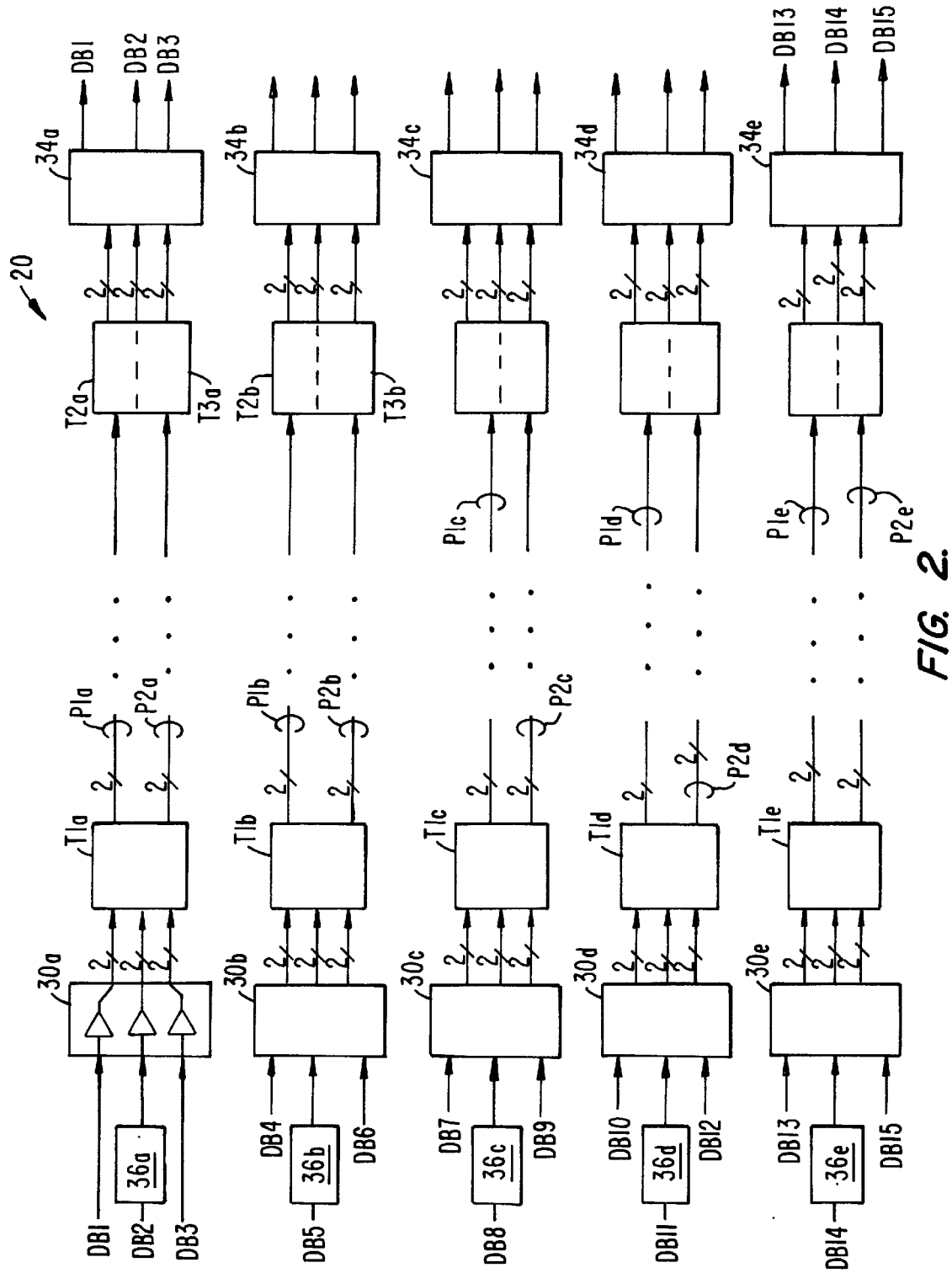
FIG. 2 illustrates use of the present invention to communicate 15 signals transmitted over 10 pairs of communication paths.

As FIG. 2 shows, the communication system 20 includes a number of line driver triplicates 30a, . . . , 30e each comprising three line receivers coupled through corresponding transformers T1a, . . . T1e to differentially drive two communication path pairs P1a/P2a, . . . , P1e/P2c. The receiving ends of the communication paths are applied to corresponding differential line receivers triplicates 34 (34a, 34b, . . . , 34e) via demodulation transformer pairs T2a/T3a, . . . , T2e/T2e. Each demodulation transformer pair will incorporate a pair of transformers such as transformers T2 and T3 of FIG. 1. Thus, each triplicate embodies basically what is shown in FIG. 1.

Each of fifteen data bits (DB1–DB15) are coupled to corresponding inputs of the line drivers that form the line drivers triplicates 30. However, five of the fifteen data bits (DB2, DB5, DB8, DB11, DB14), one for each line receiver triplicate, are coupled to the corresponding differential line driver through an encoding circuit 36 that translates the data bit to a balanced signal, such as a digital biphase signal (i.e., Manchester encoding).

Each of the transformers T1a, . . . , T1e is constructed substantially the same as that shown in FIG. 1, so that the balanced signal representing the encoded data bit is applied by its associated line driver of the triplicate to the primary of the corresponding transformer to modulate the signals of the other two data bits of the triplicate. Thus, for example, the data bit DB2 is encoded by the encoding circuit 36a as a balanced signal that is used to drive a primary winding (not shown) of the transformer T1a. The secondary windings (not shown) of the transformer T1a are serially connected in each of the legs of the communication paths P1a, P2a in the same manner as the secondary windings S1, S2 are placed in the communication paths P1, P2 of FIG. 1. Thereby, the balanced signal form of the data bit DB2 modulates the data bit signal of DB1 with one polarity while modulating the data bit signal DB3 with an opposite polarity. Operation of the other line receiver triplicates and their associated transformers are the same.

Similarly, the demodulation transformers T2a/T3a, . . . , T2e/T3e are constructed and employed in the same manner as transformers T2 and T3 of FIG. 1. Each of the transformers T2a/T3a, . . . , T2e/T3e includes a pair of primary windings (not shown in FIG. 2) driven by a corresponding one of communication paths P1a, P2a, . . . , P1e, P2e. A pair of secondary windings (not shown in FIG. 2) operates to develop a signal for application to the corresponding line receiver in each line receiver triplicate 34 that receives the balanced data signal. Not shown, but those skilled in this art will understand, is the decoder that receives the balanced signal from the corresponding line receiver to extract the data bit.

While a full and complete disclosure of the invention has been made, it will be evident to those skilled in this art that certain modifications can be made. For example, if access to the input side of the line drivers E1–E3 (FIG. 1) is available, the transformers and the line driver E3 may be deleted. Active circuits could be used to modulate the data bits with a clock or balanced signal, communicating the combination to a receiving end where the clock or balanced signal is extracted by summing the common mode parts (i.e., positive and negative) of each data signal, leaving substantially only the clock signal.

Also, the invention could be implemented using single differential data pairs—depending upon noise-immunity requirements. Thus, referring to FIG. 1, the clock signal C could be carried only by the data signal of D1, removing the need for the secondary windings S1 at the transmitting end, and the transformer T3 at the receiving end.

Finally, if the invention is to be used for high speed data transmission, it should be evident to those skilled in this art that the design and layout of transformers used must be done with care. Further, since both differential and common mode signalling is used in employment of the invention, the signal paths (e.g., P1, P2) must be properly terminated—based upon the path's transmission line characteristics.

What is claimed is:

1. Apparatus for communicating first and second data signals together with a periodic, balanced signal, comprising:

first and second driver circuits coupled to receive corresponding ones of the first and second data signals, the first and second driver circuits each having an output whereat representations of the respective first and second data signals are provided in differential mode;

a third driver circuit having an output for providing a differential mode version of the balanced signal;

first means for differentially modulating the representations of the respective first and second data signals with the differential mode version of the balanced signal in a common mode fashion;

first and second receiver circuits differentially coupled to respectively receive the representations of the first and second data signals;

a third receiver circuit having an input and an output; and second means coupled to receive the representations of the first and second data signals to extract by demodulation therefrom the differential mode version of the balanced signal for application to the input of the third receiver circuit;

wherein the first, second, and third receivers provide the first and second data signals and the balanced signal, respectively.

2. The apparatus of claim 1, wherein the balanced signal is a digital signal.

3. The apparatus of claim 2, wherein the digital signal has a duty cycle of 50 percent plus or minus 5 percent.

4. The apparatus of claim 1, wherein the balanced signal is a digital biphase signal.

5. The apparatus of claim 1, wherein the balanced signal is a third data signal encoded in a Manchester code.

6. The apparatus of claim 1, wherein the first means is a transformer having a primary winding coupled to receive the balanced signal from the output of the third driver circuit.

7. The apparatus of claim 6, including a transmission medium communicating the first and second driver circuits to the first and second receiver circuit, and wherein the transformer has first and second secondary windings coupled to form a part of the transmission medium.

8. The apparatus of claim 7, wherein the first secondary winding is coupled to receive a positive form of the differential mode version of the balanced signal, and wherein the second secondary winding is coupled to receive a negative form of the differential mode version of the balanced signal.

9. A method of communicating three data signals to a receiver using first and second pairs of transmission medium, the method including the steps of:

encoding a one of the data signals to form a balanced signal;

modulating a second one of the three data signals with a positive version of the balanced signal;

modulating a third one of the three data signals with a negative version of the balanced signal;

communicating the modulated second and third ones of the three data signals to the receiver; and demodulating the modulated second and third ones of the three data signals to retrieve the balanced signal.

10. Apparatus for communicating a data signal with a periodic, balanced signal, comprising:

a first driver circuit coupled to receive data signal, the first driver circuit each having outputs whereat differential representation of the data signal is provided;

a second driver circuit having an output for providing a differential mode version of the balanced signal;

first means for differentially modulating the representation of the data signal with the differential mode version of the balanced signal;

a first receiver circuit differentially coupled to receive the representation of the data signal;

a second receiver circuit having an input and an output; and second means coupled to receive the modulated data signal to extract by demodulation the differential mode version of the balanced signal for application to the input of the third receiver circuit;

wherein the first and second receivers provide the data signal and the balanced signal, respectively.

11. The apparatus of claim 10, wherein the balanced signal is a clock signal.

12. The apparatus of claim 11, wherein the digital signal has a duty cycle of 50 percent plus or minus 5 percent.

13. The apparatus of claim 10, wherein the balanced signal is a digital biphase signal.

14. The apparatus of claim 10, wherein the balanced signal is another data signal encoded in a Manchester code.

15. The apparatus of claim 10, wherein the first means is a transformer having a primary winding coupled to receive the balanced signal from the output of the second driver circuit.

16. The apparatus of claim 15, including a transmission medium communicating the first driver circuit to the first and second receiver circuits, and wherein the transformer has a secondary winding coupled to form a part of the transmission medium.

17. The apparatus of claim 16, wherein the second means is a transformer having a primary winding coupled to receive the modulated data signal and a secondary winding coupled to the input of the second receiver.

18. The apparatus of claim 6, including means for communicating the representations of the first and second data signals from the first and second drivers circuits to the first and second receiver circuits, respectively, and wherein the first means further includes a secondary winding coupled to means for communicating.

19. Apparatus for communicating first and second data signals together with a balanced signal, comprising:

first and second driver circuits coupled to receive corresponding ones of the first and second data signals, the first and second driver circuits each having an output whereat representations of the respective first and second data signals are provided in differential mode;

a third driver circuit having an output for providing a differential mode version of the balanced signal;

a first transformer having a primary winding coupled to receive the balanced signal from the output of the third driver circuit for differentially modulating the representations of the respective first and second data signals with the differential mode version of the balanced signal in a common mode fashion;

first and second receiver circuits differentially coupled to respectively receive the representations of the first and second data signals;

a third receiver circuit having an input and an output; and a second transformer having a primary winding coupled to receive the representations of the first and second data signals to extract therefrom by demodulation the differential mode version of the balanced signal for application to the input of the third receiver circuit;

wherein the first, second, and third receivers provide the first and second data signals and the balanced signal, respectively.

20. Apparatus for communicating first and second data signals together with a periodic digital balanced signal, comprising:

first and second driver circuits coupled to receive corresponding ones of the first and second data signals, the first and second driver circuits each having an output whereat representations of the respective first and second data signals are provided in differential mode;

a third driver circuit having an output for providing a differential mode version of the balanced signal;

first means for differentially modulating the representations of the respective first and second data signals with the differential mode version of the balanced signal in a common mode fashion;

first and second receiver circuits differentially coupled to respectively receive the representations of the first and second data signals;

a third receiver circuit having an input and an output; and second means coupled to receive the representations of the first and second data signals to extract by demodulation therefrom the differential mode version of the balanced signal for application to the input of the third receiver circuit;

wherein the first, second, and third receivers provide the first and second data signals and the balanced signal, respectively.

21. The apparatus of claim 20, wherein the periodic digital signal has a duty cycle of 50 percent plus or minus 5 percent.

* * * * *